United States Patent
Fontaine et al.

(10) Patent No.: US 7,870,557 B2
(45) Date of Patent: Jan. 11, 2011

(54) APPARATUS, SYSTEM, AND METHOD FOR AUTONOMOUSLY MAINTAINING A SINGLE SYSTEM IMAGE IN A PARALLEL SYSTEMS COMPLEX

(75) Inventors: Jeffrey G. Fontaine, San Jose, CA (US);
Dean L. Grover, Hollister, CA (US);
Claudia S. Ho, San Jose, CA (US);
Betty J. Patterson, Hollister, CA (US);
Francis J. Ricchio, San Jose, CA (US);
Judy Y. Tse, San Jose, CA (US);
Anuradha V. Vakkalagadda, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 883 days.

(21) Appl. No.: 11/761,036

(22) Filed: Jun. 11, 2007

(65) Prior Publication Data
US 2008/0307429 A1    Dec. 11, 2008

(51) Int. Cl.
*G06F 13/00* (2006.01)
(52) U.S. Cl. ................................. 719/312; 719/313
(58) Field of Classification Search ................. 719/312, 719/313
See application file for complete search history.

(56) References Cited

U.S. PATENT DOCUMENTS

| | | | |
|---|---|---|---|
| 6,950,820 B2 | 9/2005 | Bae | 707/10 |
| 7,010,576 B2 | 3/2006 | Bae | 709/213 |
| 7,430,628 B2 * | 9/2008 | Garg et al. | 710/200 |
| 2004/0044685 A1 | 3/2004 | Huynh et al. | 707/104.1 |
| 2004/0158777 A1 | 8/2004 | Bae et al. | 714/47 |
| 2005/0063300 A1 | 3/2005 | Dominic | 370/216 |
| 2006/0149790 A1 | 7/2006 | Rusch | 707/202 |
| 2008/0256238 A1 * | 10/2008 | Hu et al. | 709/226 |

OTHER PUBLICATIONS

Klein, "IMS:What's New and What's Next," IBM Software Group, IMS Technical Symposium, Koenigswinter, Germany Nov. 14-17, 2005.

(Continued)

*Primary Examiner*—Andy Ho
(74) *Attorney, Agent, or Firm*—Kunzler Needham Massey & Thorpe

(57) ABSTRACT

An apparatus, system, and method for autonomously maintaining a single system image in a parallel systems complex. A computer program product causes the relevant systems in a parallel systems complex to receive requests with a global scope from a user. The request is sent to each IMS system in the sysplex, and each IMS system applies the resource information and logs the resource information for recovery. The request is written to a shared medium which IMS sysplex members can access. When an IMS member is brought online, the IMS member restores status information first from local recovery logs. The IMS member then checks the information against the global medium to determine if requests were issued while the IMS was offline. If so, the IMS inherits the information in the global medium before processing work. An IMS added into the sysplex applies the information from the global medium before processing work.

28 Claims, 9 Drawing Sheets

OTHER PUBLICATIONS

"IBM Parallel Sysplex Clustering Technology," International Business Machines Corporation, Armonk, NY.

Sadler, "S55 IMS and RRS Working Together to Coordinate Your Updates," IBM Corporation, Nordic GSE Riga, Latvia May 23-25, 2005.

Janson, et al. "Soda: A File System for a Multicomputer," Basser Department of Computer Science, University of Sydney, Australia.

"Real-time Performance Monitoring and diagnostics for SQL Server," SQL Diagnostic Manager, Idera: Tools for a SQL Server.

* cited by examiner

APPARATUS, SYSTEM, AND METHOD FOR AUTONOMOUSLY MAINTAINING A SINGLE SYSTEM IMAGE IN A PARALLEL SYSTEMS COMPLEX

BACKGROUND OF THE INVENTION

1. Field of the Invention

This invention relates to autonomously maintaining a synchronous system image in a parallel systems complex (parallel sysplex). More particularly, the invention relates to autonomously updating and maintaining a consistent system image across a number of systems as they come online and offline.

2. Description of the Related Art

As businesses grow and develop, so do their data processing and transaction management needs. Updating and upgrading computer equipment that manages these transactions is often costly and may require significant downtime which causes further disruption and expense. In response to these problems, computing service providers currently offer the ability to group systems into a sharing systems complex; for example, IBM's Parallel Sysplex environment. These services allow an entity to connect a group of computers which will share resources and balance workloads, increasing the capability of the systems operating individually, while allowing new computers or hardware to be added to the Parallel Sysplex without taking the entire Sysplex system down. Thus, an entity can easily upscale computing capability using previous equipment and simultaneously maintain continuous application availability.

A user may further implement an IMSplex in a Parallel Sysplex environment. The IMSplex consists of one or more IBM Information Management Systems (IMS) that work together as a unit while offering the user the ability to manage multiple IMS systems as if they were a single system. This single system image allows the user to more easily manage multiple systems. The IMS database management system itself is composed of application programs, transactions, and databases. IMS requests act on transactions, databases, and area resources. In an IMSplex, transactions are placed in a shared queue, and IMS members of the IMSplex with available capacity pull work from the queue and process it.

In order to maintain this single system image and allow the IMSplex to operate properly, the IMS members in the Sysplex must have a synchronous view of the status of the IMS resources. If the IMS members that make up the Sysplex do not have the same resource status information, then errors may be introduced. For example, a user may issue a request directing that a particular transaction be stopped. If one IMS does not receive the request or otherwise does not know that the transaction should be stopped, it may begin work on the transaction which was not intended to be executed. If the transaction was stopped in order to allow changes to be made to it, the work queued by the IMS that was processing the transaction may have had the wrong attributes, in which case it will generate bad results.

The problem of maintaining a single system image manifests itself when an IMS is added to the Sysplex and when an IMS member of the Sysplex is taken offline or crashes, and is subsequently booted back up. These IMS members will not have the current picture (image or state) of the resource status that the online IMS members do; the new IMS or rebooting IMS cannot be allowed to process work until the IMS coming online shares the same image as that held by the other IMS members of the Sysplex.

Typically, a user would have to keep track of the status and issue requests on the Sysplex and at the newly started IMS or restarted IMS in order to bring the IMS coming online in synch with the Sysplex members. The process is cumbersome and requires time, effort, and skill on the part of the user; in addition, user error (such as missing or forgetting a particular request) may later generate errors that must be located and reversed.

Other solutions include polling between IMS members for changes and determining based on the poll results a proper or expected Sysplex status. However, polling and monitoring the behavior of the IMS members adds additional work to the system and is cumbersome to implement. If no changes have occurred, processing overhead in conducting the polling is wasted.

SUMMARY OF THE INVENTION

From the foregoing discussion, it should be apparent that a need exists for an apparatus, system, and method to maintain a single-system image in a parallel systems complex. Beneficially, such an apparatus, system, and method operate autonomously to generate this image and do so efficiently, such that the system is not heavily burdened by the requirement of maintaining the image.

The present invention has been developed in response to the present state of the art, and in particular, in response to the problems and needs in the art that have not yet been fully solved. Accordingly, the present invention has been developed to provide an apparatus, system, and method for autonomously maintaining a single system image in a parallel systems complex that overcomes many or all of the above-discussed shortcomings in the art.

The present invention comprises a computer program product, the operations of the computer program product comprising receiving a global systems level request and sending the request and a unique token to online IMS members of the parallel systems complex. The operations of the computer program product further comprises causing the IMS members to write resource information, comprising a resource name and a resource status from the global systems level request, to a local resource status and the IMS members logging the resource information and unique token to a resource block associated with the online IMS members. The operations of the computer program product further comprises writing resource information and the unique token to a shared medium and sending resource information from the shared medium to a booting IMS, the IMS determining whether the local resource status is in agreement with the resource information.

In one embodiment, the operations of the computer program product further comprises causing a booting IMS to determine whether the resource block associated with the booting IMS contains a unique token. If the resource block has a unique token, the operations of the computer program product further comprises loading the local resource status with the resource information in the resource block and requesting a most recent unique token associated with resource information in the shared medium. The operations of the computer program product further comprises the IMS member comparing the most recent unique token associated with resource information in the shared medium to a most recent unique token associated with status information in the local resource block of the booting IMS member. The operations of the computer program product further comprises applying the resource information in the shared medium to the local resource status of the booting IMS member in response to the most recent unique token associated with the resource information in the shared medium being different from the most recent unique token associated with the resource information in the resource block.

In one embodiment, the operations of the computer program product further comprises an IMS member without resource information in the resource block requesting resource information from the shared medium and applying the resource information to the local resource status before processing work.

The present invention further comprises a system for autonomously maintaining a single system image in a parallel systems complex, the system comprising a Common Service Layer, comprising a processor in communication with memory, configured to receive a global systems level request, send the global systems level request and a unique token to online IMS that comprise the parallel systems complex, write resource information to a shared medium, and provide resource information from the shared medium to a booting IMS, the IMS determining whether a local resource status is in agreement with the resource information.

The system further comprises one or more IMS members, comprising a processor in communication with memory, that comprise the parallel systems complex configured to store resource information from the global systems level request to a local resource status and to log resource information from the global systems level request and the unique token to a resource block.

The system further comprises a coupling facility comprising a processor in communication with memory configured to maintain the shared medium and provide information from the shared medium to the Common Service Layer.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
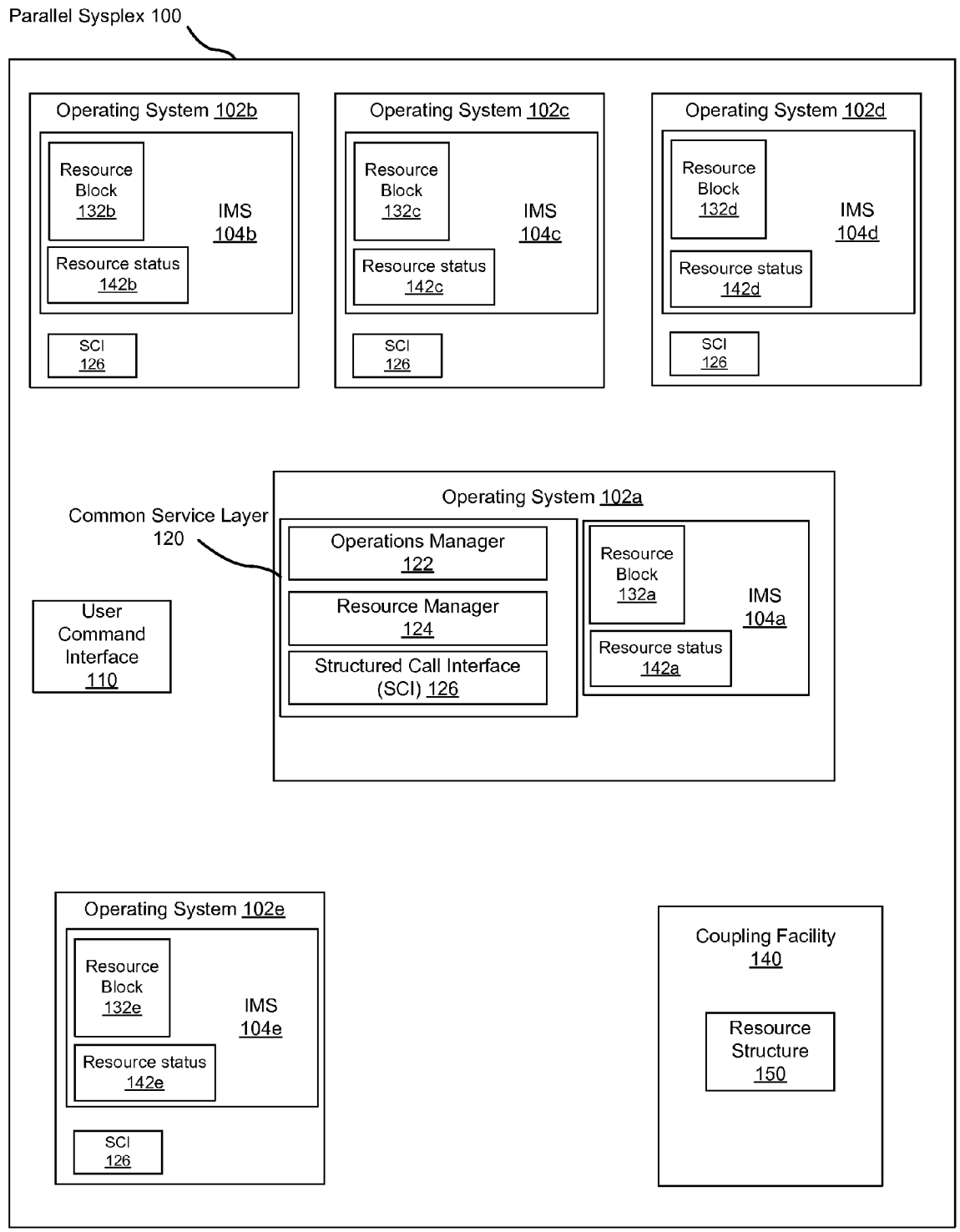
FIG. 1 is a schematic block diagram illustrating one embodiment of a parallel systems complex in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of retaining data or causing execution of a program of machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of a group of IMS members organized in a parallel systems complex, or parallel sysplex 100. In one embodiment of a sysplex environment, a set of IBM z/OS systems communicate and cooperate with one another in order to process workloads. The embodiment also shows the IMS members configured in an IMSplex (a form of parallel sysplex 100 that includes just IMS members). The one or more IMS subsystems work together as a unit. In typical embodiments, IMSs in the IMSplex share databases, resources, and/or message queues. Within the IMSplex, a user can manage multiple IMS subsystems as if they were one system. The IMSplex comprises the IMS members 104*a-e*. The IMS are part of, respectively, Operating Systems 102*a-e*.

A user may send requests to the IMS members of the IMSplex through a user request interface 110. The user request interface 110 acts as a logical single point of control for the collection of systems in the Parallel Sysplex 100. In one embodiment, the user request interface 110 is an additional hardware component connected to the parallel sysplex 100. The user request interface 110 may also be a single point of control application (SPOC) such as TSO SPOC or REXX SPOC API. The user request interface 110 provides a user with the ability to access whatever interfaces are necessary for a given task for the systems in the Sysplex, whether for Sysplex members collectively or individually, without the need for a control point to be physically attached to every system in the Parallel Sysplex.

The IMSplex further comprises a Common Service Layer (CSL) 120 located on Operating System 102*a* in the depicted embodiment. The CSL 120 is a collection of IMS manager address spaces that provide the infrastructure needed for systems management tasks. The CSL 120 provides the Sysplex 100 with improved systems management, a single system image, the ability to manage the Sysplex 100 through a user request interface 110, and with shared resources that can be used across the IMS members. The CSL 120 provides a user with the infrastructure necessary for the operation of the Sysplex environment, facilitating and coordinating the data and resource sharing activities of the Sysplex. The CSL 120 provides the tools necessary to create, maintain, and manage multiple IMS as an IMSplex.

Those of skill in the art will recognize that the system may further comprise a Common Queue Server (CQS) which is a generalized server that manages data objects on the coupling facility 140, described below, on behalf of multiple clients, such as the IMS members of the IMSplex. The CQS provides the Sysplex 100 with the communications tools necessary to access and maintain global resources on the coupling facility 140. While not a part of the CSL 120, the CQS may be used to enable key CSL 120 activities, particularly those performed by the resource manager 124, discussed below.

The Common Service Layer (CSL) 120 further comprises an Operations Manager 122, Resource Manager 124, and Structured Call Interface (SCI) 126. The Operations Manager 122 controls the operations of the IMSplex and provides APIs through which requests can be issued and responses received. The operations manager (OM) 122 receives processing control when an OM request, such as an IMS request, is received by the OM 122 API. Requests and responses to requests come through the OM 122 API. As such, in an IMSplex the OM 122 routes IMS requests to IMS members registered for the request and consolidates request responses from IMS members into a single response to facilitate presentation to the request originator. The OM 122 also provides a programming API for IMS requests to allow for automation and provides a programming interface to support a request-processing client.

The Resource Manager 124 manages global resource on behalf of its clients. The resource manager (RM) 124 provides the infrastructure needed for managing these resources and performing coordination tasks. The RM 124 is responsible for maintaining the global resource information in a resource structure on the coupling facility 140. In one embodiment, the RM 124 uses the CQS, described above, to maintain the global resource information.

The SCI 126 provides a common communication protocol between IMSplex components such as the CSL 120 components and IMS subsystems. The SCI 126 allows the IMSplex members to communicate with one another, whether within a single z/OS image or among multiple z/OS images. The SCI 126 facilitates this communication by providing a single call interface which isolates the sender and receiver from the underlying communications technology. The SCI 126 routes messages and requests within the IMSplex, registers and deregisters IMSplex members, The SCI 126 also notifies IMSplex members when a member joins or leaves the IMSplex.

Those of skill in the art will recognize that a parallel sysplex or IMSplex may be more of less complicated than what is shown in FIG. 1. For example, an IMSplex may comprise more or less IMS members than those shown, and the CSL 120 may comprise an Operations Manager 122 and Resource Manager 124 on more than one Operating System in order to provide improved performance and stability. The embodiment of the parallel sysplex shown is meant to be illustrative of only one of many possible parallel sysplex configurations. Some details and components of a parallel Sysplex 100 are not illustrated in order to simplify the figure and allow the focus of the discussion to be the contributions of the present invention to the Sysplex.

FIG. 1 further illustrates five Operating Systems 102*a-e*, each executing an IMS Control Region 104*a-e*. In a preferred embodiment, Operating Systems 102*a-e* are the IBM z/OS Operating System. SCI 126, which is considered part of the CSL 120, is integrated with each Operating System 102*a-e*. IMS Control Regions 104*a-e* are also integrated with each Operating System 102*a-e*.

Each IMS Control Region 102*a-e* further comprises a Resource Block—132*a-e* and a Resource Status 142*a-e*. In one embodiment, the Resource Block 132*a-e* comprises persistent memory such that when an IMS goes offline the information stored therein is recoverable. The resource block 142a-e may, for example, comprise EEPROM or other persistent memory. Alternatively, the resource block 132a-e may be a device separate from the IMS control region 104a-e with a distinct power supply which is accessible for both reading and writing operations by the IMS control region 104a-e. A device, partition, or other component to which an IMS control region 104a-e can create log records recoverable in the event of an abend or other failure may constitute a resource block 132a-e. In the depicted embodiment, each IMS control region 104a-e has a corresponding resource block 132a-e to which that IMS member logs resource status information. Those of skill in the art will recognize that the depiction of the resource block 132a-e within the IMS control region 104a-e is an illustrative, as opposed to a restrictive, example.

In one embodiment, the Resource Status 142a-e contains the operational resource status information for the particular IMS member. In contrast to the resource block 132a-e, the resource status 142a-e comprises nonpersistent volatile memory, such as DRAM or SRAM. In the event of an IMS control region 104a-e abend or failure, the resource status 142a-e information may not be recoverable. The resource status 142a-e contains the IMS control region's 104a-e perceived status of a particular resource. For example, the resource status 142b may indicate that a resource TRAN4 has status STOPQ. As a result, IMS control region 104b will not queue work which is associated with TRAN4 until the status of tran4 changes in the resource status 142b. The resource status 142a-e may contain different information than given in the above illustrative example. Further, the resource status 142a-e may be implemented as a data structure, table, or other structure known to those skilled in the art. The resource status 142a-e does not need to be separate from the resource block 132a-e if the resource status 142a-e is implemented using persistent memory.

FIG. 1 also illustrates a coupling facility 140. In order for sharing to occur in accordance with the present invention, members of the system must be able to access a shared medium. The shared medium is a logical or physical unit to which system members can write data and from which systems members can read data. In the depicted embodiment, the coupling facility 140 is the shared medium for the parallel sysplex. The coupling facility 140 serves as a central point of communication between the IMS regions 104a-e of the Sysplex 100. In particular, the coupling facility 140 provides high-speed caching, list processing, and locking functions in the sysplex environment. In one embodiment, the coupling facility 140 is a special, logical partition. Alternatively, the coupling facility 140 may comprise an additional hardware component of the sysplex.

In addition, the coupling facility 140 enables sysplex 100 data sharing. Data sharing refers to the ability of sysplex members, such as the depicted IMS regions 104a-e, to store data into and retrieve data from the coupling facility 140 which serves as a central location as it is accessible to each IMS member of the sysplex 100. The IMS regions 104a-e store and retrieve data through the services of the resource manager 124, as described above.

Figure 3:
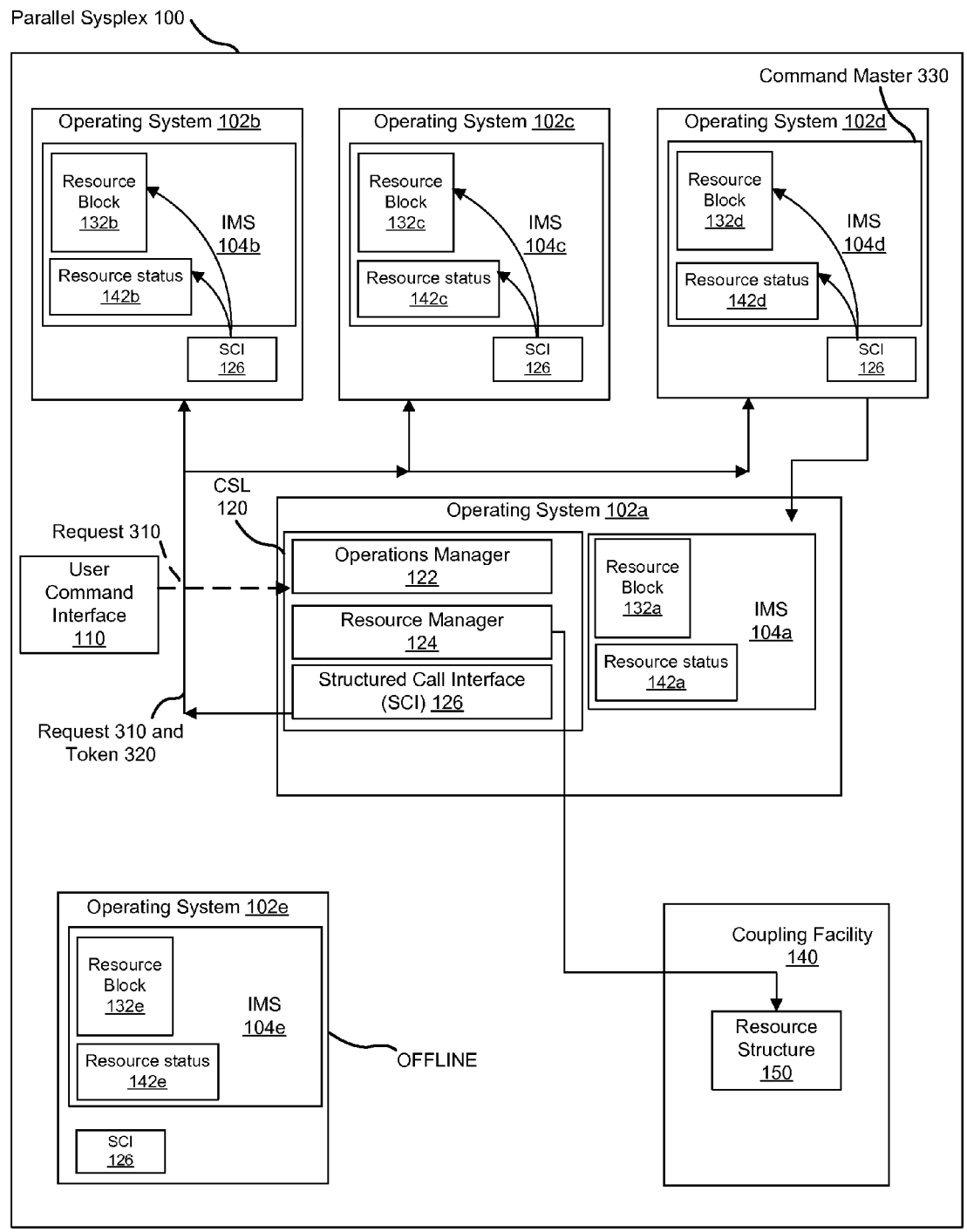
FIG. 3 is a schematic block diagram illustrating one embodiment of the operation of a parallel systems complex in response to a global systems level request in accordance with the present invention.

The coupling facility 140 comprises a resource structure 150. The resource structure 150 serves as a common area where resource information for the entire sysplex may be stored. Resource information constitutes the resource names and associated status of the resource. In the example given above, the resource information would constitute "TRAN4" (resource name) associated with "STOPQ" (resource status). Those of skill in the art will recognize that resource information may comprise more information than that indicated above; in the present invention, resource information further comprises a unique token associated with the resource name and status, as described in greater detail below. In one embodiment, the resource structure 150 is a data structure with fields containing the relevant resource information and the relationship between the information. FIG. 3 more fully explains the role of the resource structure 150 in the present invention.

Figure 2:
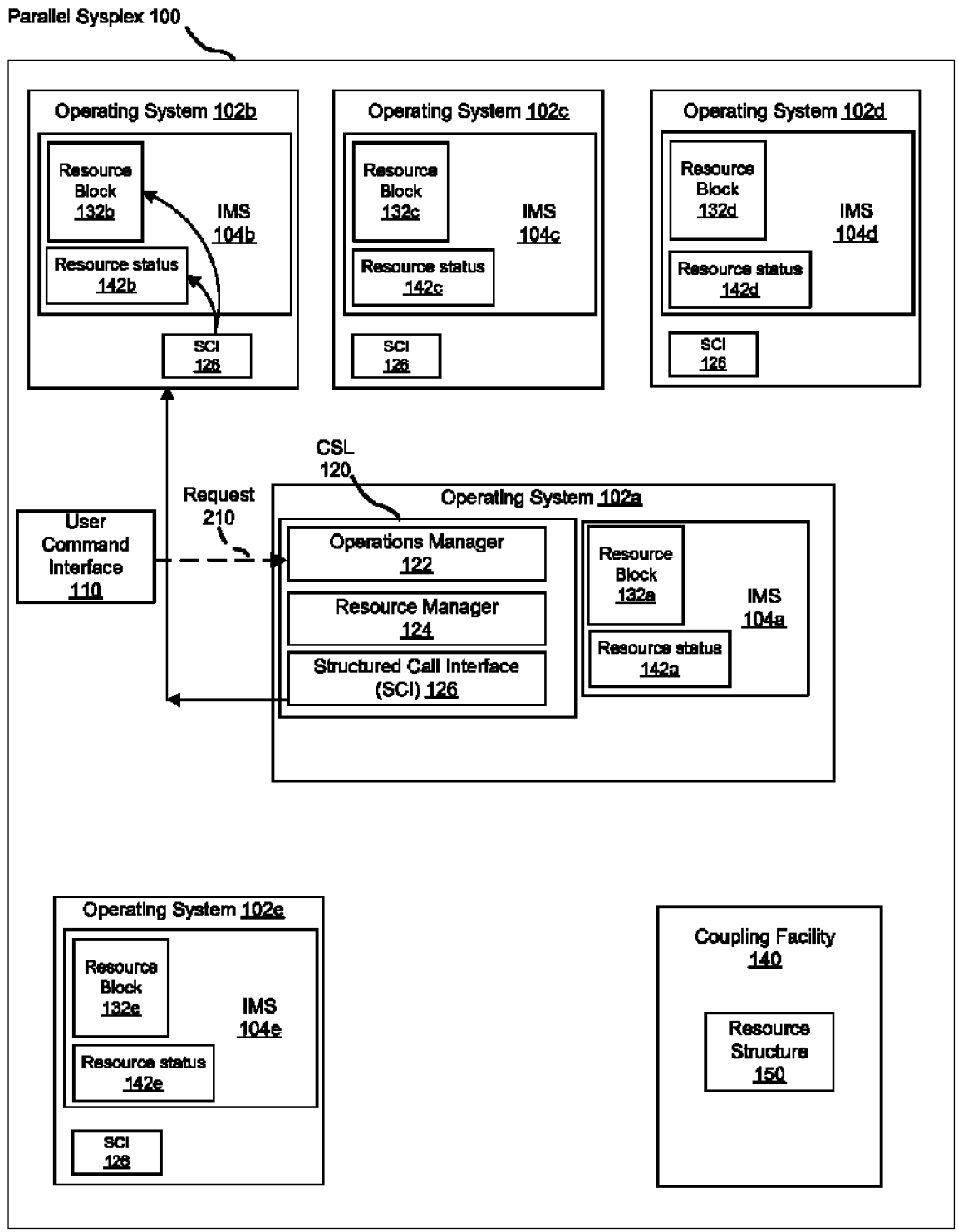
FIG. 2 is a schematic block diagram illustrating one embodiment of the operation of a parallel systems complex in response to a local systems level request in accordance with the present invention.

FIGS. 2 and 3 are schematic block diagrams illustrating data flow in the parallel Sysplex 100 in response to user requests of local and global scope respectively in accordance with the present invention. In a parallel sysplex 100, a request may have global or local scope; global requests are applied to all active or online IMS members 102a-e participating in the parallel sysplex 100. Global requests are maintained both globally and locally. Local requests are applied to a particular IMS member of the parallel sysplex 100 and are not maintained globally. Those of skill in the art will recognize that a request may be either user-driven, such as a request generated from the user command interface 110, or program driven. For example, a request may be generated by a program through any means known to those in the art, such as a method call.

FIG. 2 illustrates an example of processing a local request. In FIG. 2, a request 210 with local scope specifying IMS region 104b is sent by a user from the user request interface 110. The local scope may be indicated by a keyword in the request or a special set of local requests. The operations manager 122 in the CSL 120 receives the local request 210. The operations manager 122 routes the request 210 to the IMSplex member registered for the request; in this example, IMS region 104b. The operations manager 122 routes the request 210 to IMS region 104b via the SCI 126, which, as explained above, provides a common communication language between IMSplex components. Upon receiving the request 210, IMS region 104b applies the request to the local resource status 142b and the local resource block 132b. An IMS region 104b applying the local request constitutes the IMS region 104b deriving details from the request resource information, such as the name of the resources affected by the request and the updated status of these resources, and adding or updating the resource name and status in the resource status 142b accordingly. For example, if request 210 was to "STOP TRAN1" for scheduling, IMS 104b would update a status indicator for TRAN1 at IMS 104b stored in the local resource status 142b to a new status of "STOPSCHD." The IMS 104b also logs the status name TRAN1 and associated status update STOPSCD to the local resource block 132b.

FIG. 3 illustrates the response of the parallel sysplex 100 to a user request 310 from user request interface 110. A user gives the request 310 a global scope and sends it to the sysplex 100 from user request interface 110. The operations manager 122 receives the request 310, and determines that the scope is set to global. In accordance with the present invention, operations manager 122 then creates a unique token 320, such as a timestamp, and associates the token 320 with the global request 310. In one embodiment, associating the token 320 with a request 310 may comprise inserting the token 320 into the request information as an additional field. The operations manager 122 also designates an IMS member 104a-e to act as the request master 330 for the particular request 310. In the depicted embodiment, IMS 104d is the designated request master 330. The designation of a request master IMS 330 is existing functionality known to those in the art.

The operations manager 122 then routes the request 310 and token 320 to all online IMS members 104a-e of the parallel sysplex 100. The SCI 126 provides the request 310 and token 320 to each online IMS member 104*a*-*e* in the parallel sysplex 100. In the depicted embodiment, the request 310 is received by IMS members 104*a*-*d*. IMS member 104*e* is depicted as being offline; as such, it does not receive the request 310. When IMS 104*e* is brought back online, IMS 104*e* will initially be out of synch with the rest of the IMS members 104*a*-*d* of the parallel sysplex 100.

Upon receiving the request 310 and token 320, the IMS members 104*a*-*d* apply the request 310 to the respective local resource status 142*a*-*e*. As in the case of a local request, as depicted in relation with FIG. 2, an IMS region 104*a*-*d* applying the local request constitutes the IMS region 104*a*-*d* deriving information from the request resource information, such as the name of the resources affected by the request and the updated status of these resources, and adding or updating the resource name and status in the resource status 142*b* accordingly.

In contrast to FIG. 2 above, the IMS members 104*a*-*d* then log the resource information and the token 320 to the local resource block 131-134. The resource information and token 320 are associated within the resource block; in one embodiment, the resource block 132*a*-*d* may comprise a table with fields for the resource name, resource status, and a unique token. In the depicted embodiment, all three fields are populated for each resource affected by the request, such that an application can determine the relationship between the resource names, status, and tokens.

For example, if request 310 was to "START TRAN4", and the user had set the scope to global, the operations manager 122 would associate a unique token with the request such as "tok6." "Tok6" may comprise timestamp information such as the time and date the request 310 was received such that "Tok6" can be distinguished from both earlier and later tokens. Each IMS member 102*a*-*d* would receive this request and assign TRAN4 a status of STARTQ, STARTSCD in the resource status 142*a*-*d*. If TRAN4 already had a status in the resource status 142*a*-*d*, the status would be updated. If TRAN4 was not previously in the resource status 142*a*-*d*, a new entry would be created for it.

The IMS member 104*a*-*d* also logs the resource name TRAN4 and updated status STARTQ, STARTSCHD along with the token "Tok6" to the resource block 132*a*-*d*. In the depicted embodiment, the token "Tok6" is not stored or otherwise accounted for in the resource status 142*a*-*d*; rather, in accordance with the present invention, the token is used for recovery purposes and as such is stored in the resource block 132*a*-*d*.

IMS member 104*d*, as the request master 330, is responsible for storing the resource information from request 310 and the token 320 in the resource structure 150 on the coupling facility 140 in order to preserve the resource information in a globally accessible medium. IMS member 104*d* sends resource information derived from global request 310 and token 330 to the resource manager 124, which manages the global resources and coordinates IMSplex-wide processes on behalf of its clients, and instructs the RM 124 to store the information in the resource structure 150. In this embodiment, the resource manager 124 stores the resource information derived from the global request 310 and the unique token 320, as received from the request master 330, on the resource structure 150. The resource structure 150 serves as a shared medium for the sysplex 100. Those of skill in the art will recognize that in an alternative embodiment the RM 124 can use the CQS described above to store the resource information and the unique token in the resource structure 150.

To continue the example above, IMS member 104*d* instructs the RM 124 to store resource name TRAN4, the status STARTQ, STARTSCHD, and the unique token "Tok6" on the resource structure 150. As a result, an online IMS member 102*a*-*e* may access this resource information stored on the resource structure 150 through a request to the RM 124.

Figure 4:
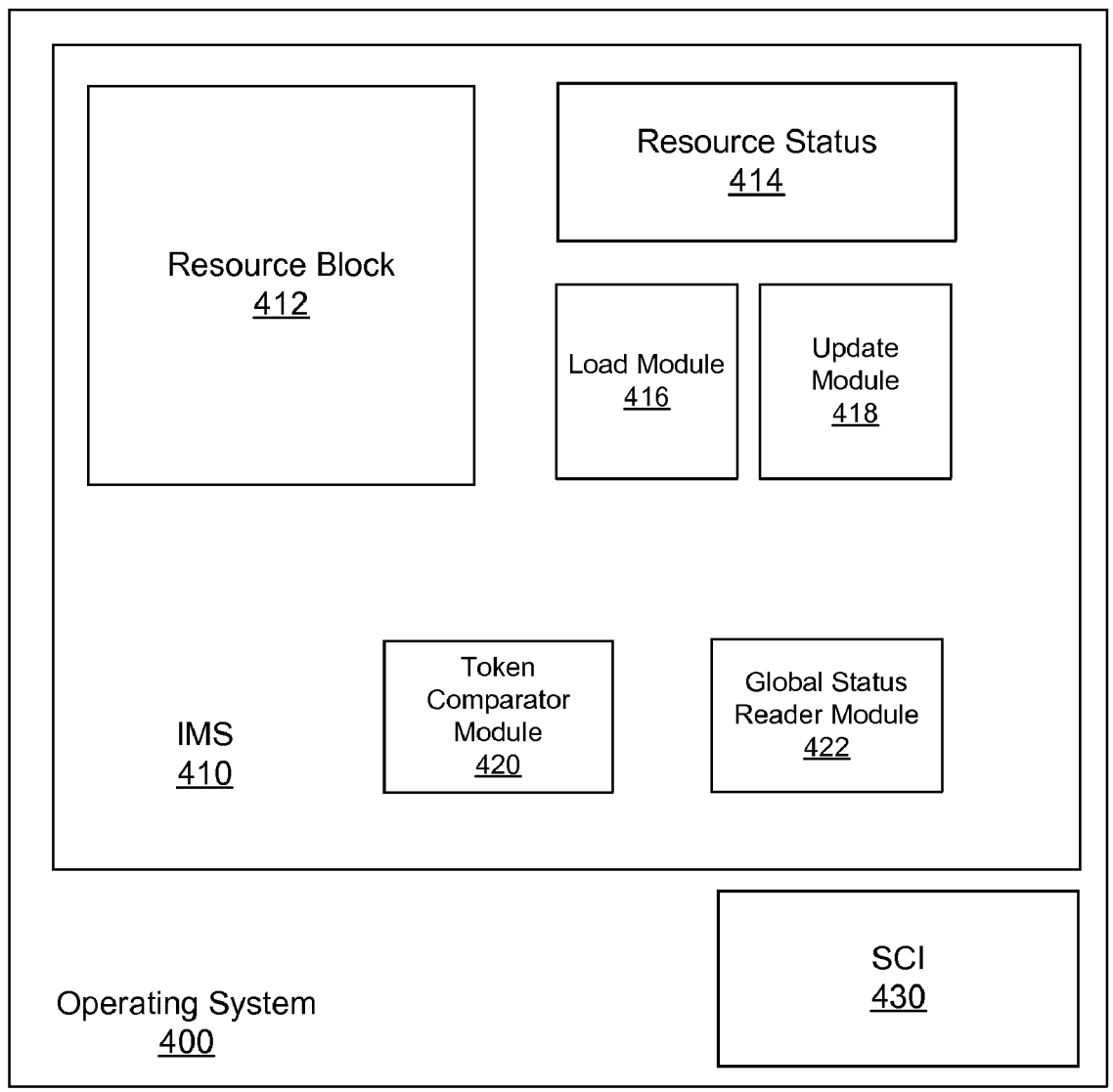
FIG. 4 is a schematic block diagram illustrating one embodiment of an IMS system in accordance with the present invention.

FIG. 4 is a schematic block diagram of one embodiment of an IMS member 410 in accordance with the present invention. The operating system 400 comprises an IMS control region 410 and a SCI 430, each of which have been described above. The IMS 410, in accordance with the present invention, further comprises a resource block 412, a resource status 414, a load module 416, an update module 418, a token comparator module 420, and a global status reader module 422.

The operations and contents of the resource status 414 and resource block 412 are explained in more detail above in connection with the discussion of resource status 142*a*-*e* and resource block 132*a*-*e*. Briefly, the resource status 414 contains the operational resource status information for the particular IMS 410. The IMS 410 acts upon resources in the sysplex 100 in accordance with the designated status, as stored in the resource status 414. For instance, if TRAN2 has a status of STOPQ in the resource status 414, IMS 410 will not process work on TRAN2 even if there is work to be done for TRAN2 in a queue accessible to IMS 410. The resource block 412 comprises persistent memory such that when an IMS 410 goes offline the information stored therein is not lost. As such, in one embodiment, the resource block 412 acts as a back-up allowing the restoration of status information lost from the resource status 414 when the IMS is brought down.

In accordance with the present invention, the IMS control region 410 further comprises a load module 416 which loads resource information stored in the resource block 412 into the resource status 414 when an IMS 410 is booted up. The load module 416 provides the IMS region 410 with an 'initial picture' of the resources in the Sysplex 100 by restoring the 'picture' the IMS region 410 had before it went offline, as logged in the resource block 412. For example, if IMS region 410 went offline at 4:00 am on a Saturday, and logs had been properly kept in the resource block 412, when the IMS region 410 is brought back online the following Monday at 1:00 pm the load module 416 restores the resource status 414 to its state as of the shutdown on Saturday at 4:00 am, as stored in the resource block 412.

The global status reader module 422 gets token information and resource information from the resource structure 150 stored on the coupling facility 140 when the IMS 410 is booted up. The global status reader module 422 gets this information by making appropriate requests for information from the resource structure 150 through the SCI 430 to the resource manager 124. As explained above, the RM 124 accesses the information on the coupling facility 140 and then returns the requested information to the global status reader module 422 through the SCI 430.

The token comparator module 420 determines whether or not the IMS region 410 is out of synch with the Sysplex 100. The token comparator module 420 gets a most recent token stored in the resource block 412 and a most recent token stored in the resource structure 150. In one embodiment, the token comparator module 420 requests tokens from the resource block 412 and determines which token is the most recent. The token comparator module 420 similarly requests tokens in the resource structure 150 from the global status reader module 422 and determines which of these tokens is the most recent. The token comparator module then determines which of the most recent tokens, from the resource block 412 and the resource structure 150, is the most recent. If the token in the resource structure 150, which serves as the global shared medium, is the most recent, the token comparator module 420 instructs the update module 418 to apply the resource information in the resource structure 150 to the resource status 414 in order to bring the IMS region 410 in synch with the sysplex 100.

To continue the previous example, the token comparator module 420 may determine that the most recent token in the resource block 412 was one generated at 1:00 am on Saturday. By making requests for tokens on the resource structure 150, it then determines that the most recent token stored on the resource structure 150 was one generated at 11:00 am on Monday. Between these two most recent tokens, the token comparator module 420 then determines that the one on the resource structure 150 is the more current of the two.

In an alternative embodiment, the token comparator module 420 may simply determine if the most recent token from the resource block 412 and the most recent token from the resource structure 150 are different; since, in the present embodiment, tokens are generated only for global requests, a token stored in the resource block 412 of an IMS region 410 is also stored in the resource structure 150. As such, the resource block 412 cannot have a more recent token than one on the resource structure 150. If the most recent tokens from the two sources do not match, then the token on the resource structure 150 must be more recent.

The update module 418, upon direction from the token comparator module 420, gets resource information from the resource structure 150 through the global status reader module 422 and applies this resource information to the resource status 414 in order to bring the IMS region 410 back into synch with the Sysplex 100. The update module 418 further determines whether each piece of resource information in the resource status 414 is local status or global status. The update module 418 does not remove, write over, or affect the local status information in the resource status 414 unless the global resource information in the resource structure 150 explicitly overwrites that information. Resource information derived from requests with global scope, as loaded from resource block 412 by load module 416, are replaced with resource information derived from requests with global scope as loaded from the resource structure 150.

To continue with our example, the token comparator module 420 determines that the IMS region 410 is out of synch with the Sysplex 100 and instructs the update module 418 to apply the resource information from the resource structure 150 to the resource status 414. The update module 418 requests the resource information from the resource structure 150 from the global status reader module 422. For example, if the resource status 414 has a status of STOPQ for TRAN3, as restored by the load module 416 from the resource block 412, but TRAN3 has a status of STARTQ, STARTSCHD in the resource structure 150, this new status for TRAN3 is stored in the resource status 414. If, however, IMS region 410 had a status of STOPQ for TRAN2, which status was derived from a local request, and there is nothing in the resource structure 150 indicating a new status for TRAN2, the status of TRAN2 is not changed.

Figure 5:
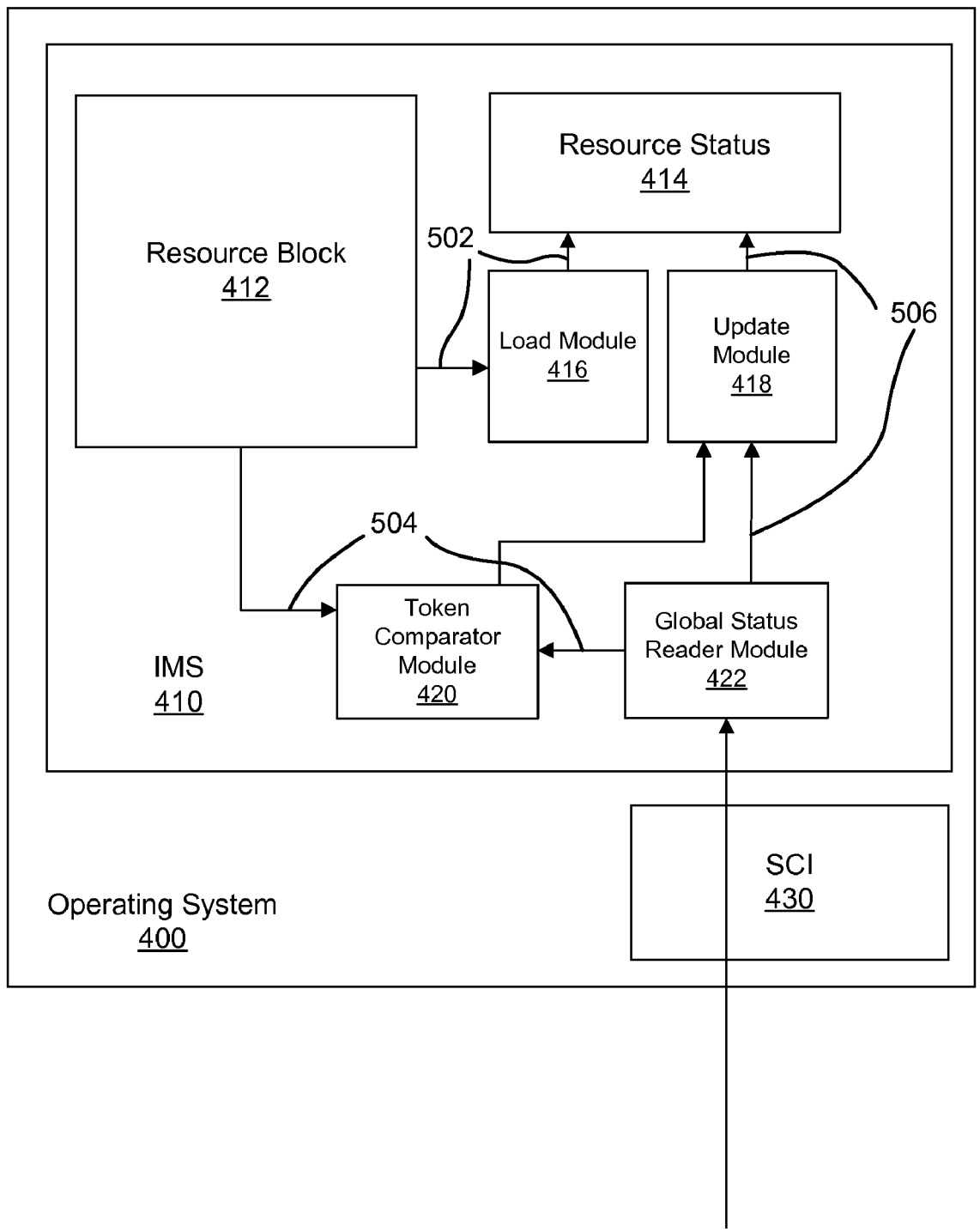
FIG. 5 is a schematic block diagram illustrating one embodiment of an IMS system performing synchronization in accordance with the present invention.

FIG. 5 is a schematic block diagram of one embodiment of an IMS region 410 synchronizing resource status 414 in accordance with the present invention. When the IMS region 410 is booted up, the load module 416 restores the resource information stored in the resource block 412 to the resource status 414, as depicted by the arrow series 502. In one embodiment, this resource information constitutes a resource name and status. Resource information for both local and global requests are loaded into resource status 414.

Once the resource information is loaded into the resource status 414, the global status reader module 422 requests a most recent unique token stored in the resource structure 150. In another embodiment, the global status reader module 422 provides token information from the resource structure 150 to the token comparator module 420, which determines which token is most recent. The most recent unique token represents an identifier for the most recent global systems level request from which resource information was derived and stored on the coupling facility 140. The global status reader module 422 passes this most recent token associated with global resource information to the token comparator module 420. If there is no token in the resource structure 150, then there is no global status from which the IMS 410 may be out of synch. As such, the IMS 410 begins operation with the resource status 414 as loaded by the resource block 412.

If there is a token in the resource structure 150, the token comparator module 420 receives the most recent token associated with global resource information from the global status reader module 422 and determines a most recent token associated with resource information in the resource block 412, as depicted by the arrow series 504. The token comparator module 420 then compares the two tokens received—one representing a most recent global status of the resource information according to the global medium, and one representing a most recent global status of the resource information according to the IMS 410 local medium. If the token from the resource structure 150 (the global medium) is more recent, than a global request was issued while the IMS 410 was offline, and the resource information in the resource status 414 must be updated before the IMS 410 can begin to process work in the IMSplex. If the tokens are equal, than no global systems level requests were issued while the IMS 410 was offline, and the resource status 414, as restored by the load module 416, is correct and the IMS 410 may begin to process work.

If the token comparator module 420 determines that the token from the resource structure 150 is more recent than that from the resource block 412, it directs the update module 418 to update the resource status 414 with resource information from the resource structure 150. The update module 418 receives the resource information from the resource structure 150 through the global status reader module 422. The update module 418 then loads the resource status 414 with the global resource information stored on the resource structure 150, as depicted by the arrow series 506. The update module 418 does not, however, remove or overwrite the resource information local to IMS 410, as recovered from the resource block 412, unless the global resource information from the resource structure 150 indicates that a change must be made. Thus, resource information derived from local requests, as shown in connection with FIG. 2, remains in the resource status 414 absent a subsequent global request overriding the local request. This aspect of the invention is further explained in connection with FIG. 8.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
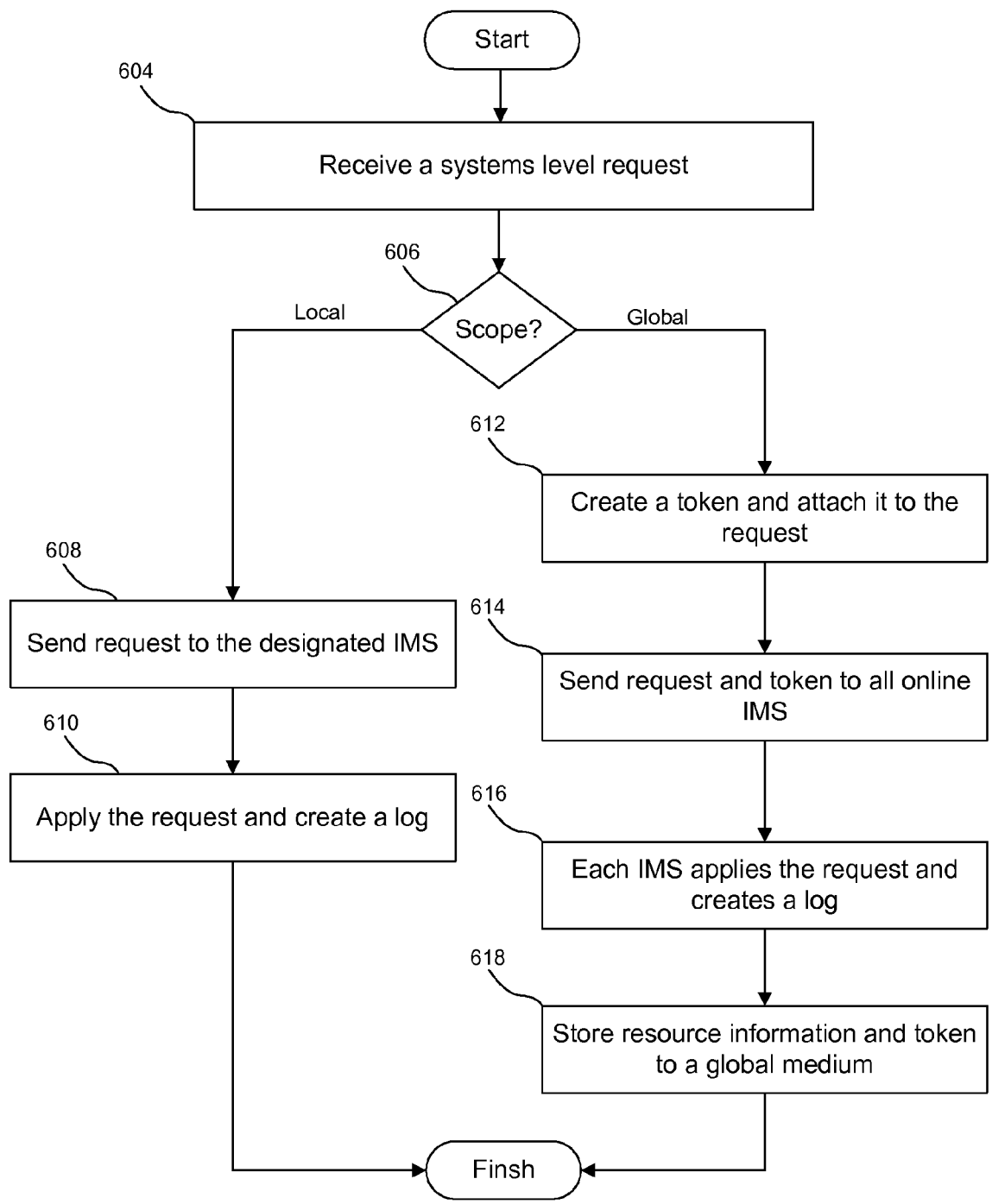
FIG. 6 is a schematic flow chart diagram illustrating one embodiment of a method for creating resource information in accordance with the present invention.

FIG. 6 is a schematic flow chart diagram illustrating a method for creating both local and global resource information. The method starts when the operations manager 122 receives 604 a systems level request. In one embodiment, the systems level request is received from a user request interface 110. After receiving the request, the operations manager 122 determines 606 whether the scope of the request is local or global. If the scope is local, the request is sent 608 to the designated IMS member. The IMS member applies 610 the request by deriving resource information from it and storing that resource information in the IMS's local resource status 414. The IMS member further creates a log by storing the resource information in the local resource block 412.

If the operations manager 122 determines 606 that the scope of the request is global, it then creates 612 a unique token which is attached or otherwise associated with the request and sent 614 with the request to all online IMS members of the sysplex 100. Each IMS member that receives the request applies the request by deriving resource information from it and storing 618 that resource information in the local resource structure 414. Each IMS also creates 618 a log of the resource information in the resource block 412 and stores the unique token associated with the resource information in the resource block 412 as well.

In addition to each IMS member storing the resource information and token locally, an IMS designated the request master directs the resource manager 124 to store 618 the resource information and token to a global medium such as the resource structure 150 stored on the coupling facility 140.

Figure 7:
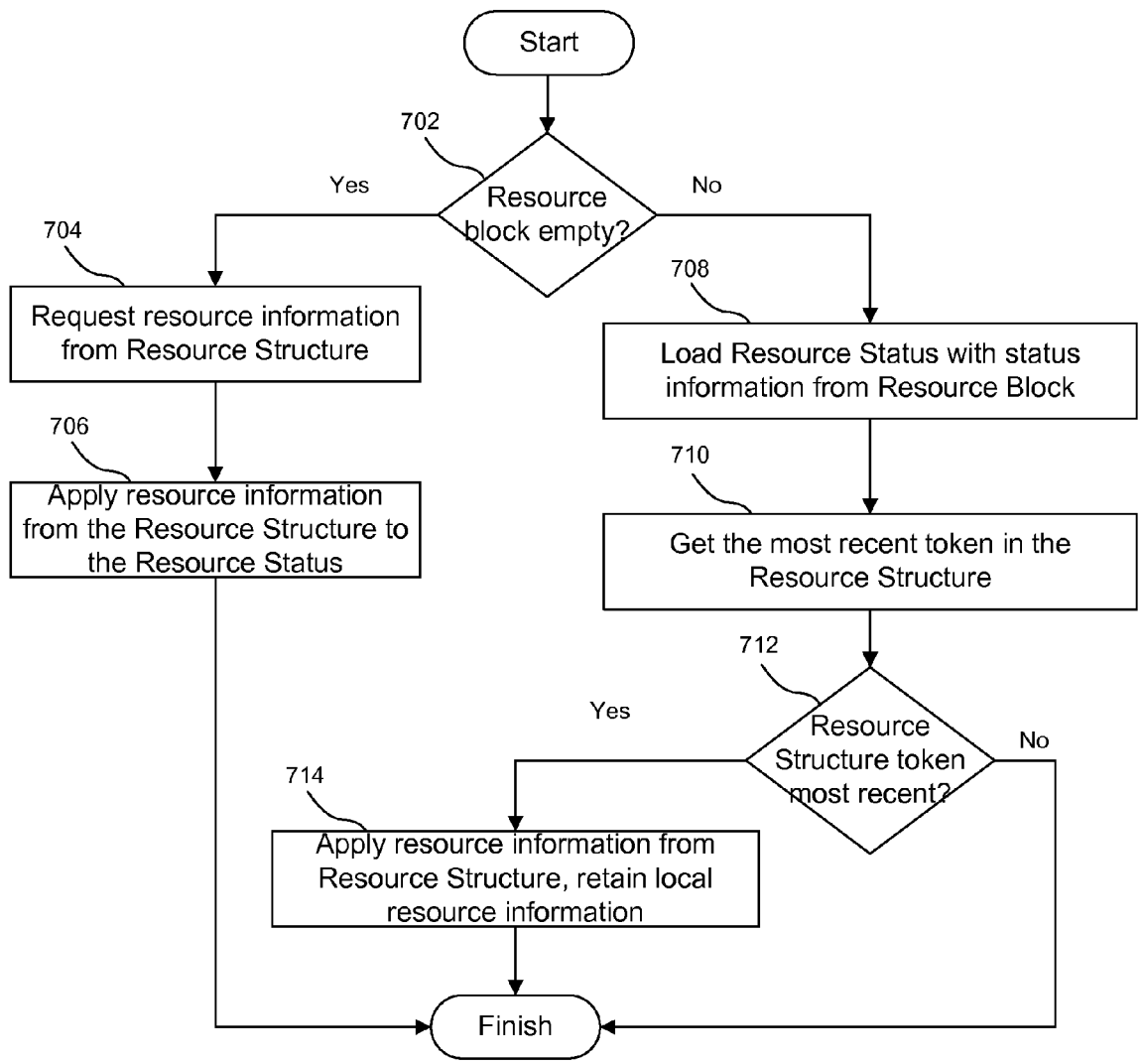
FIG. 7 is a schematic flow chart diagram illustrating one embodiment of a method for autonomously synchronizing a booting IMS in accordance with the present invention.

FIG. 7 is a schematic flow chart diagram illustrating a method for synchronizing the resource information of a booting IMS member of a sysplex. The method starts with a determination 702 of whether the booting IMS local resource block 412 contains resource information. In one embodiment, the load module 416 determines whether there is resource information in the resource block 412. If the resource block 412 is empty, the global status reader module 422 requests 704 resource information from the resource structure 150 on the coupling facility 140. The update module 418 then applies 706 this global resource information from the resource structure 150 to the resource status 414. At this point, the local IMS resource status 414 will have the same resource information as that held by the other IMS members of the sysplex 100.

If the load module 416 determines 702 that the resource block 412 of the booting IMS contains resource information, then the load module 416 loads 708 the resource structure 150 of the booting IMS with the resource information in the resource block 412. Once the resource structure 150 is loaded with the resource information from the resource block 412, the global status reader module 422 gets 710 the most recent token in the resource structure 150 on the coupling facility 140. The token comparator module 420 compares the most recent token in the resource structure 150 with the most recent token in the local IMS resource block 412 and determines 712 whether the token from the resource structure 150 is the most recent. If so, the update module 418 applies 714 the resource information from the resource structure 150 to the local IMS resource status 414. As noted previously, local resource information loaded from the resource block 412 remains absent global resource information from the resource structure 150 overwriting it.

If the token comparator module 420 determines 712 that the token from the resource structure 150 is not the most recent, the booting IMS is in-synch with the sysplex and no changes need to be made to the local resource status 414.

Figure 8A:
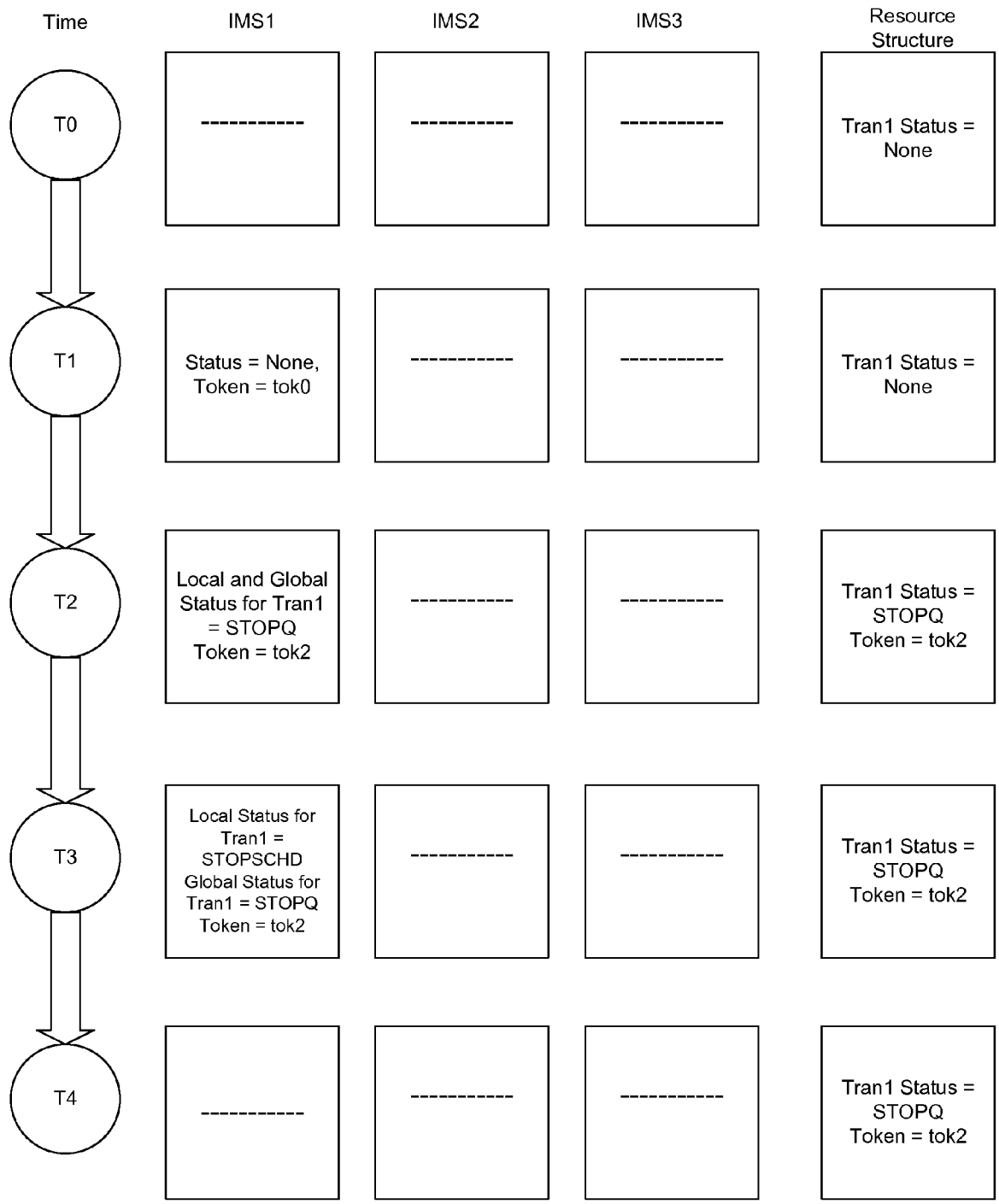
FIGS. 8A and 8B are a schematic block diagram illustrating one example of synchronizing IMS in a parallel systems complex in accordance with the present invention.
Figure 8B:
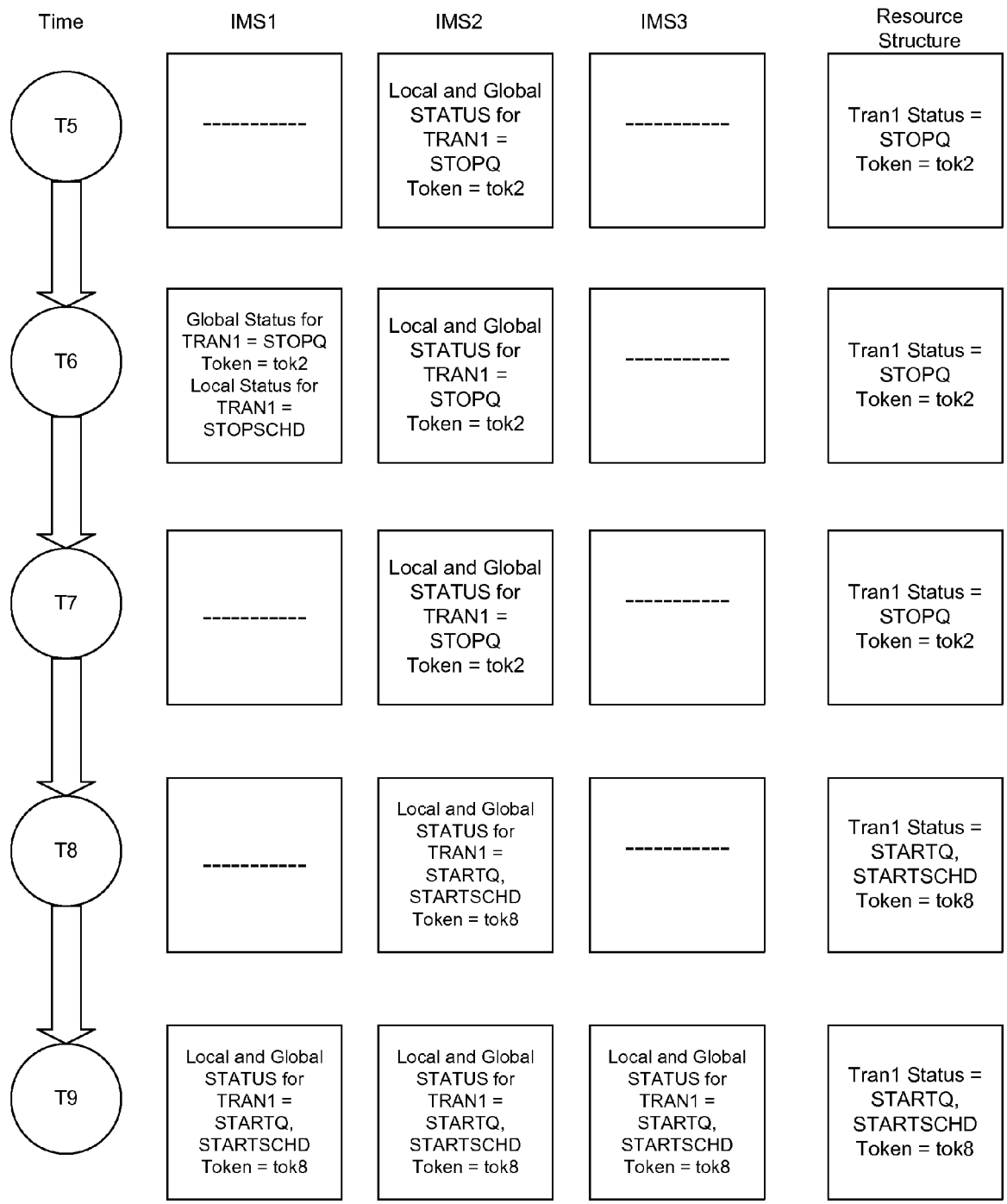

FIGS. 8A and 8B provide an example timeline of the operation of the present invention to autonomously maintain a synchronous single system image in a parallel systems complex. The Figures depict the representative status of three IMS members, IMS1, IMS2, and IMS3, along with the resource structure 150 which serves as a global medium on a coupling facility 140. The IMS units and the resource structure 150 are connected in a parallel sysplex environment 100. The figures depict the changing resource information for the IMS members of the sysplex and the synchronization process.

At time T0, the coupling facility 140 and resource structure 150 are started, as is the CSL 120 and its constituent components, the SCI 126, resource manager 124 and operations manager 122. When the resource structure 150 is started there is no resource information in the structure. The three IMS units are offline.

At time T1, IMS1 is booted. As the IMS1 is first started, there is no resource information in its local resource block 412 to load into the resource status 414. As such, it requests resource information from the resource structure 150. As there is nothing in the resource structure 150, there is no resource information to be loaded to IMS1 before it begins processing work. IMS2 and IMS3 remain offline.

At time T2, a request with both local scope to IMS1 and global scope is issued to STOP TRAN1 for queuing. IMS1 receives the request and a unique token and applies the resource information to the resource status 414 and then logs it and the token to resource block 412. As such, both the local and global status in IMS1 for TRAN1 is STOPQ. In addition, IMS1 is designated the request master and it writes the resource information and unique token to the resource structure 150.

At T3, a request with local scope is issued to STOP TRAN1 for scheduling on IMS1. The local status of Tran1 in the resource status 414 at IMS1 is updated to STOPSCHD. The global status of Tran1 in the resource status 414 at IMS1 remains STOPQ as the issued request had local scope only. The change to the local status in the resource status 414 is also logged to the resource block 412. Since the request was local, there is no global work to be done and the resource structure 150 remains unchanged.

At T4, IMS4 is brought down. IMS4 may have been purposefully stopped, or may be experiencing an unplanned outage. The resource information in the resource status 414 is lost when IMS4 goes down.

At T5, IMS2 is booted up. IMS2, as a new member of the sysplex, has no resource information stored in its local resource block 412. Since the resource block 412 is empty, IMS2 goes to the resource structure 150 for the resource information necessary to fill its resource status 414. IMS2 therefore inherits the status STOPQ for TRAN1 from the resource structure 150.

At T6, IMS1 is booted back up. IMS1 has resource information in its resource block 412, and as such, applies that resource information to the resource status 412. The resource status 414 gets the local status of STOPSCHD and the global status of STOPQ for TRAN1. IMS1 then compares the token associated with the global resource information in the resource block 414 (which is token 2) with the token in the resource structure 150 (which is token 2). Since the tokens are the same, IMS1 determines that there was no change to the global status while it was offline and keeps the resource information in its resource status 414 that it loaded from resource block 412. The global status is not inherited from the resource structure 150.

At T7, IMS1 is brought down. At T8, a request with global and local scope is issued to START TRAN1. The local status of Tran1 in the resource status 414 of IMS2 is updated to STARTQ, STARTSCHD. The global status of Tran1 in the resource status 414 of IMS2 is also set to STARTQ, STARTSCHD. The change to the local and global status in the resource status 414 is also logged to the resource block 412, along with the unique token associated with the global request. IMS2 is designated the request master and it writes the resource information and unique token to the resource structure 150.

At T9, IMS1 and IMS3 are both started. Since IMS3 does not have any resource information in its local resource block 414, it gets resource information from the resource structure 150 and applies it to the local resource status 414, as explained above. As such, IMS3 inherits the global status for TRAN1=STARTQ, STARTSCHD.

IMS1 first applies the resource information from the resource block 414 as described above. The local status is TRAN1=STOPSCHD and the global status is TRAN1=STOPQ. It then compares the token in the resource block 414 (which is tok2) to the token in the resource structure (which is tok8). Since tok8 is more recent than tok2, IMS1 inherits the resource information from the resource structure 150, changing the resource status to TRAN1=STARTQ, STARTSCHD. Since the global resource information in the resource structure 150 and the local resource information both deal with TRAN1, the global resource information 'trumps' the local and dictates the proper status of TRAN1.

If, in the alternative, there were a local resource status of IMS1 for a resource named TRAN2, the application of the global resource status from the resource structure 150 would not affect that local resource information, and TRAN2 would retain the local resource status even after the application of the global resource information to the resource status 414.

IMS3 is brought online for the first time at T9, and as explained above, inherits its resource information from the resource structure 150 in the coupling facility 140. At T9, all IMS share a synchronous view of the resources with global scope; as such, a single system image is maintained in the parallel sysplex without user intervention even though IMS units have gone offline and been brought online at different points.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program for autonomously maintaining a single system image in a parallel systems complex, the operations of the computer program product comprising:
    receiving a global systems level request;
    sending the global systems level request and a unique token to online Information Management Systems (IMS) that comprise the parallel systems complex, the online IMSs applying resource information from the global systems level request and the unique token to a local resource status;
    writing resource information from the global systems level request and a unique token to a shared medium; and
    sending resource information from the shared medium to a booting IMS, the booting IMS determining whether the local resource status is in agreement with the resource information.

2. The computer program product of claim 1, wherein the local resource status comprises persistent storage, and wherein the IMS determining whether the local resource status is in agreement with the resource information further comprises a booting IMS determining whether the local resource status associated with the IMS contains a unique token.

3. The computer program product of claim 2, further comprising a booting IMS member of the parallel systems complex with a unique token in the local resource status:
    requesting from the shared medium a most recent unique token associated with resource information in the shared medium;
    comparing the most recent unique token associated with resource information in the shared medium to the unique token associated with the resource information in the local resource status of the booting IMS member; and
    applying the resource information in the shared medium to the local resource status of the booting IMS member in response to the most recent unique token associated with the resource information in the shared medium being different from the unique token associated with the resource information in the local resource status.

4. The computer program product of claim 3, wherein applying the resource information in the shared medium to the local resource status of the booting IMS member further comprises retaining the resource information from a local systems level request in the local resource status.

5. The computer program product of claim 2, further comprising an IMS system without a unique token in the local resource status requesting resource information from the shared medium and applying the resource information to the local resource status.

6. The computer program product of claim 1, further comprising generating the unique token and associating the unique token with the global systems level request.

7. The computer program product of claim 6, wherein the unique token is a timestamp.

8. The computer program product of claim 1, wherein sending resource information from the shared medium to a booting IMS further comprises the booting IMS requesting the resource information from a Common Service Layer, which Common Service Layer retrieves the resource information from the shared medium and sends the resource information to the booting IMS.

9. The computer program product of claim 1 wherein writing resource information to a shared medium further comprises an IMS designated request master directing a Common Service Layer to write the resource information to the shared medium.

10. The computer program product of claim 1, wherein the global systems level request is received from a user request interface.

11. The computer program product of claim 10, further comprising a user issuing a systems level request from the single point of control and specifying a scope for the systems level request.

12. The computer program product of claim 1, wherein sending the global systems level request and the unique token to online IMSs further comprises each online IMS logging the resource information and unique token to a resource block associated with the online IMS.

13. The computer program product of claim 1, wherein the resource information comprises a resource name, a resource status, and the unique token.

14. The computer program product of claim 1, wherein the shared medium is a data structure located on a coupling facility.

15. A computer program product comprising a computer useable medium having a computer readable program for autonomously maintaining a single system image in a parallel systems complex, the operations of the computer program product comprising:
  receiving a global systems level request;
  sending the global systems level request and a unique token to online Information Management Systems (IMS) that comprise the parallel systems complex, each online IMS:
    storing resource information comprising a resource name and a resource status from the global systems level request to a local resource status;
    logging the status information and unique token to a resource block associated with the online IMS;
  writing resource information and the unique token to a shared medium; and
  sending resource information from the shared medium to a booting IMS, the IMS determining whether the local resource status is in agreement with the resource information.

16. The computer program product of claim 15, wherein the IMS determining whether the local resource status is in agreement with the resource information further comprises a booting IMS determining whether the resource block associated with the booting IMS contains a unique token.

17. The computer program product of claim 16, further comprising a booting IMS member of the parallel systems complex with a unique token in the resource block:
  loading the local resource status with the status information in the resource block;
  requesting a most recent unique token associated with resource information from the shared medium;
  comparing the most recent unique token associated with resource information in the shared medium to a most recent unique token associated with status information in the local resource block of the booting IMS member; and
  applying the resource information in the shared medium to the local resource status of the booting IMS member in response to the most recent unique token associated with the resource information in the shared medium being different from the most recent unique token associated with the status information in the resource block.

18. The computer program product of claim 17, wherein applying the resource information in the shared medium to the local resource status of the booting IMS member further comprises retaining resource status from a local global systems level request in the local resource status.

19. The computer program product of claim 16, further comprising an IMS system without status information in the resource block requesting resource information from the shared medium and applying the resource information to the local resource status.

20. The computer program product of claim 15, wherein the global systems level request is received from a user issuing a systems level request from a single point of control and specifying a scope for the systems level request.

21. The computer program product of claim 15, further comprising determining whether the scope of the systems level request is global or local and issuing local requests to specified IMS.

22. The computer program product of claim 15, wherein the unique token is a timestamp associated with a global systems level request by the IMS receiving the global systems level request and timestamp.

23. The computer program product of claim 15, wherein the shared medium is a data structure located on a coupling facility.

24. A system for autonomously maintaining a single system image in a parallel systems complex, the system comprising:
  a Common Service Layer comprising a processor in communication with memory configured to:
    receive a global systems level request;
    send the global systems level request and a unique token to online Information Management Systems (IMS) that comprise the parallel systems complex;
    write resource information to a shared medium;
    provide resource information from the shared medium to a booting IMS, the IMS determining whether a local resource status is in agreement with the resource information;
  one or more IMS comprising a processor in communication with memory that comprise the parallel systems complex configured to:
    store resource information from the global systems level request to the local resource status and to log the resource information from the global systems level request and the unique token to a resource block; and
  a coupling facility comprising a processor in communication with memory configured to maintain the shared medium and provide information from the shared medium to the Common Service Layer.

25. The information management system of claim 24, further comprising a Single Point of Control configured to provide the Common Service Layer with a global systems level request.

26. The information management system of claim 24, wherein an IMS designated the request master instructs the Common Service Layer to write resource information to the shared medium.

27. The information management system of claim 24, wherein the shared medium is a data structure located on a coupling facility.

28. The information management system of claim 24, wherein the Common Service Layer comprises an Operations Manager, a Resource Manager, and a Structured Call Interface.

* * * * *